United States Patent Office 3,260,727
Patented July 12, 1966

3,260,727
CERTAIN ARYL-SUBSTITUTED-1,1-ETHYLENE-BIS-LACTAM COMPOUNDS
Richard A. Hickner and William W. Bakke, Midland, Mich., assignors to The Dow Chemical Company, Midland, Mich., a corporation of Delaware
No Drawing. Filed Feb. 2, 1962, Ser. No. 170,831
3 Claims. (Cl. 260—307)

The present invention is concerned with heterocyclic organic chemical compounds and is more particularly directed to certain compounds of which the structural formula is

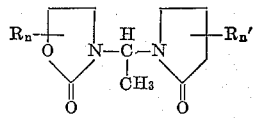

wherein any substituent R or R' represents a member of the group consisting of phenyl, lower alkylphenyl, and loweralkyl and $n$ represents an integer of from 0 to 2, inclusive.

The compounds of the present invention are white solids at room temperature, essentially stable when dry or when in solution at a pH of 7 or above; when in aqueous dispersion having a pH of less than 7 the compounds tend to be unstable. They are soluble in various liquid media including aqueous solutions having a pH of 7 or greater such as, for example, 10 percent aqueous sodium hydroxide; somewhat soluble in xylene, benzene, water, acetone, and in 95 percent ethanol. In various of these media, they are more soluble than in various others with the result that the selective precipitation from liquid dispersion is not difficult to accomplish.

The present compounds are useful as solubilizing agents in the formulation of fluid preparations of substances of difficult solubility in various common solvents. Also, the compounds of the present invention have useful biological properties. They have given effective control of internal parasites of warm-blooded animals when administered orally in foods; some of them have moderate insecticidal activity whereas others are useful as toxicants for the selective control of weeds. Also, they are useful as additives to improve the properties of specialty lubricants including notably those which are either of a generally aqueous nature or which are characterized by being generally hydrophyllic. Such lubricants are commonly used when it is necessary to lubricate the adjacent and opposed faces of, for example, rubber articles, or rubber-to-metal contact.

The compounds of the present invention are readily prepared in excellent yield by a reaction which may be depicted generally according to either of the equations

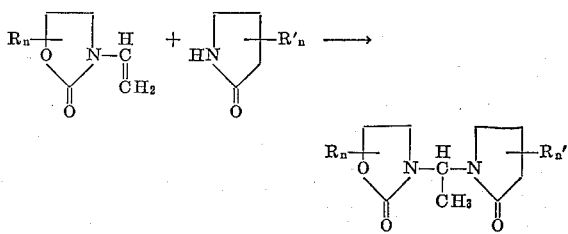

or

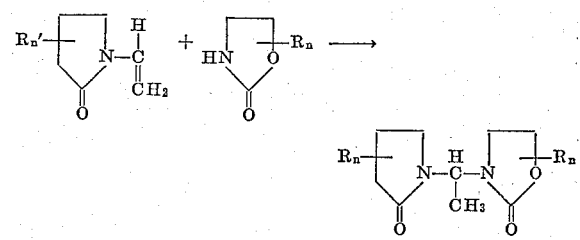

wherein R and R', and $n$ have the meanings hereinbefore designated.

The reaction is, in general, exothermic and, in the presence of a small amount of acidic catalyst goes forward promptly and in good yield when the starting substances are combined at room temperature. The reaction is characterized by a distinctive but controllable release of energy which, in the absence of effective cooling means, will be represented as a temperature rise.

In the preparation of the present products no by-product is formed. Solvents, together with dissolved uncombined starting materials, if any, are readily removed by filtration leaving the desired product as a white residue which may, if desired, be washed with further portions of the same liquid reaction medium. Moderate amounts of products will be lost in some media.

In carrying out the reaction to prepare the present products, the starting materials may be combined in any desired proportion, in the presence or absence of liquid reaction medium, and at any temperature which does not result in thermal damage to either starting material, desired products, or reaction medium if any. Desirably, the reactants are combined in equimolecular amounts, inasmuch as such amounts are the reacting amounts of the various substances. In such instance, reaction is virtually complete.

Acidic catalyst may be any acidic catalytic substance of an extremely wide variety. The presence of water in the reaction medium is to be avoided in order to avoid the development of a hydrogen ion concentration corresponding to a pH so low as to be injurious. Thus, any strong acid substance containing little or no water may be employed. Representative acidic materials which are successfully employed include concentrated sulfuric acid, hydrogen chloride either in the anhydrous form or of a very low degree of hydration; trichloroacetic acid, toluene sulfonic acid, or acidic producing substances as thionyl chloride, phosgene, or phosphorous halides and the like.

Any inert liquid reaction medium may be used successfully. For the reasons set forth in respect to the acid substances above, the inert reaction medium should be essentially water-free.

When the present products are prepared under good conditions and are not objectionably contaminated, the otherwise unpurified product of reaction, with no treatment other than removal of liquid reaction medium, if any, may be employed to obtain the advantages and benefits of the present invention. When desired, the product may be solvent washed, dissolved and selectively reprecipitated, and treated in other ways known to those skilled in the art to purify them.

In a representative preparation, 43.5 grams (0.5 mole) 2-oxazolidinone and 55.5 grams (0.5 mole) N-vinylpyrrolidone were dissolved together in 125 milliliters dry benzene at room temperature. A trace of anhydrous hydrogen chloride was supplied thereto as catalyst, whereupon the temperature of the resulting mixture rapidly rose to approximately 45° C. The vessel in which the reacting mixture was confined was then externally cooled to prevent further excessive temperature rise. After a few minutes of initial reaction time the product began to precipitate in the said reaction mixture. The resulting mixture was then mechanically stirred for a period of two hours at the end of which time stirring was discontinued and the precipitate removed by filtration. The resulting product was, when freed of liquid reaction medium, 62 grams (a yield of 63 percent by weight of starting material) of a white solid substance melting in the range of 73–78° C. No effort was made to retrieve product from filtrate.

The product, 3-(1-(2-oxo-1-pyrrolidinyl)ethyl)-2-oxazolidinone was found to be a bland, inodorous substance of very low inherent toxicity to warm-blooded animals, but relatively effective as a herbicide. In a representative operation, the application of an aqueous dispersion containing the 3-(1-(2-oxo-1-pyrrolidinyl)ethyl)-2-oxazolidinone as sole toxicant at the rate of 100 parts of the said toxicant per million parts by weight of total aqueous preparation to an area of soil heavily infested with seeds of crabgrass resulted in an almost complete suppression of the germination and growth of the crabgrass seeds. Also, the germination and growth of pigweed seeds was significantly suppressed.

Also, the inclusion of one-quarter of one percent by weight of the said compound in the diet of a group of laboratory mice resulted in a significant reduction in the population, in the digestive tracts of the said mice, of trichostrongylid parasites.

The preparation of other compounds of the present invention follows essentially the same procedure as the foregoing preparation.

For instance, a solution of 127 grams (1.0 mole) of N-vinyl-5-methyl-2-oxazolidinone and 85 grams (1.0 mole) of 2-pyrrolidone in 200 milliliters dry benzene was induced to react at an advantageous rate by introducing thereinto, with all substances at approximately room temperature, a small amount of anhydrous hydrogen chloride. Immediately following introduction of the said hydrogen chloride, the temperature of the resulting mixture rose rapidly to 57° C., wherefrom it was permitted spontaneously to cool to room temperature with continuous stirring for two hours. At the end of this time, the resulting mixture was chilled over a bath of water and ice whereupon the desired product precipitated. The resulting mixture was filtered to obtain 90 grams (43 weight percent of theoretical) of the desired 5-methyl-3-(1-(2-oxo-1-pyrrolidinyl)-ethyl)-2-oxazolidinone as a white solid melting at 141–143° C. and of 96 percent purity.

No attempt was made to obtain a maximum yield although in view of the known moderate solubility of the reaction product in the reaction medium benzene, it is believed that a work-up designed to avoid loss in solvent would have resulted in a yield of more than 90 percent.

A similar product, 4-methyl-3-(1-(2-oxo-1-pyrrolidinyl)ethyl)-2-oxazolidinone is obtained by reacting together N-vinyl-4-methyl-2-oxazolidinone and 2-pyrrolidinone under similar conditions.

It is immaterial upon which of the two heterocyclic nuclei the reactive vinyl radical appears. For instance, a solution of 55.5 grams (0.5 mole) of N-vinyl-2-pyrrolidone and 50.5 grams (0.5 mole) of 5-methyl-2-oxazolidinone were dissolved together in 100 milliliters dry benzene to which then was added ten drops concentrated sulfuric acid. As a result of the addition of the acidic catalyst material, the temperature rose rapidly above room temperature to an undetermined higher temperature below the boiling temperature of the mixture, at which external cooling was applied to maintain the temperature of the reacting mixture below about 35° C. Stirring was continued for an additional hour as the resulting mixture gradually cooled to room temperature. At the end of this time, a precipitate had formed and it was separated from the reaction mixture by vacuum filtration. As a result of these procedures, and with no attempt to retrieve product lost in the removal of solvent, there was obtained 56 grams (53 percent of theoretical yield by weight of starting material) of a 5-methyl-3-(1-(2-oxo-1-pyrrolidinyl)ethyl)-2-oxazolidinone product identical with the same product prepared as described above. The substances had similar properties in all respects and gave essentially identical infrared spectra. The product was further purified by dissolving in absolute ethanol and recrystallization therefrom at the temperature of solid carbon dioxide (Dry Ice). After two such recrystallizations, there was obtained a white product which melted at a temperature of 141–143° C. The product was found, on analysis, to contain 56.3 percent carbon and 7.23 percent hydrogen as compared with theoretical values of 56.6 percent carbon and 7.55 percent hydrogen.

By the use of starting materials the selection of which will be obvious in view of the foregoing, other products of the present invention are prepared. For instance, employing 5-p-tolyl-3-vinyl oxazolidin-2-one and 4-methylpyrrolidinone, there is obtained a 4-methyl-3-(1-(2-oxo-1-pyrrolidinyl)ethyl)-5-p-tolyl-2-oxazolidinone product. A white solid, it is relatively soluble in benzene and, when it is desired to be recovered from its reaction mixture in good yield, should be prepared in reaction medium other than such aromatic substance as xylene, toluene, benzene or the like. One such reaction medium is a lower alkanol.

Also, when employing 5-tertiarybutyl-3-vinyl oxazolidin-2-one and 4-phenylpyrrolidinone, there is obtained a 5-tertiarybutyl-3-(1-(2-oxo-4-phenyl-1-pyrrolidinyl)-ethyl)-2-oxazolidinone product. An identical product is obtained through the use of 5-tertiarybutyloxazolidin-2-one and 1-vinyl-4-phenyl pyrrolidin-2-one.

Similarly, when employing 5-(p-tertiarybutylphenyl)-4-methyloxazolidin-2-one and 1-vinyl-p-cumenyl-2-ethyl pyrrolidin-2-one there is obtained a 5-(p-tertiarybutylphenyl)-3-(1-(3-p-cumenyl-2-ethyl-5-oxo-1-pyrrolidinyl)ethyl-4-methyl-2-oxazolidinone product as a white solid, soluble in aromatic solvents. Products similar to the foregoing in many ways are prepared when employing starting substances of which the heterocyclic rings contain other such substituents. So long as substituents upon the heterocyclic rings are lower-alkyl groups, radicals of up to and including 4 carbon atoms, or phenyl, or alkyl-substituted phenyl whereof any alkyl group is of up to 4 carbon atoms, any choice of substituents dwells within the scope of the present invention.

Illustrative of the anthelmintic utility of the present invention, the inclusion of one-half of one percent by weight of total diet of the essentially harmless and non-toxic 5-methyl-3-(1-(2-oxo-1-pyrrolidinyl)ethyl)-2-oxazolidinone product in the diet of a group of laboratory mice heavily infested with Helminths resulted in 100 percent control of the tape worms.

In the present specification and claims, the expression loweralkyl designates an alkyl group of from 1 to about 4 carbon atoms. Oxazolidin-2-one is the same compound as 2-oxazolidinone and the same relationship extends to the pyrrolidinones. Placing the number positioning a ketonic oxygen before the compound or group is conventional in the U.S.A.; placing it before the modified syllable is conventional among many European chemists.

Various of the present starting materials are articles of commerce. Those that are not are prepared in known syntheses.

I claim:
1. 4-methyl-3-(1-(2-oxo-1-pyrrolidinyl)ethyl)-5-p-tolyl-2-oxazolidinone.
2. 5-tertiarybutyl-3-(1-(2-oxo-4-phenyl-1-pyrrolidinyl)ethyl)-2-oxazolidinone.

3. 5-(paratertiarybutylphenyl)-3-(1-(3-p-cumenyl-2-ethyl-5-oxo-1-pyrrolidinyl)ethyl)-4-methyl-2-oxazolidinone.

References Cited by the Examiner

UNITED STATES PATENTS 3,072,652  1/1963  Hickner et al. ____ 260—307.3
3,072,672  1/1963  Hickner et al. ____ 260—307.3

FOREIGN PATENTS 728,699  4/1955  Great Britain.

OTHER REFERENCES

Fuson: Advanced Organic Chemistry, New York, 1950, pages 471–473.

Shostakovskii et al.: Chem. Abstracts, vol. 53, col. 18937 (1959).

HENRY R. JILES, *Acting Primary Examiner.*

DUVAL T. McCUTCHEN, NICHOLAS S. RIZZO, A. D. ROLLINS, *Assistant Examiners.*